Figure 1:
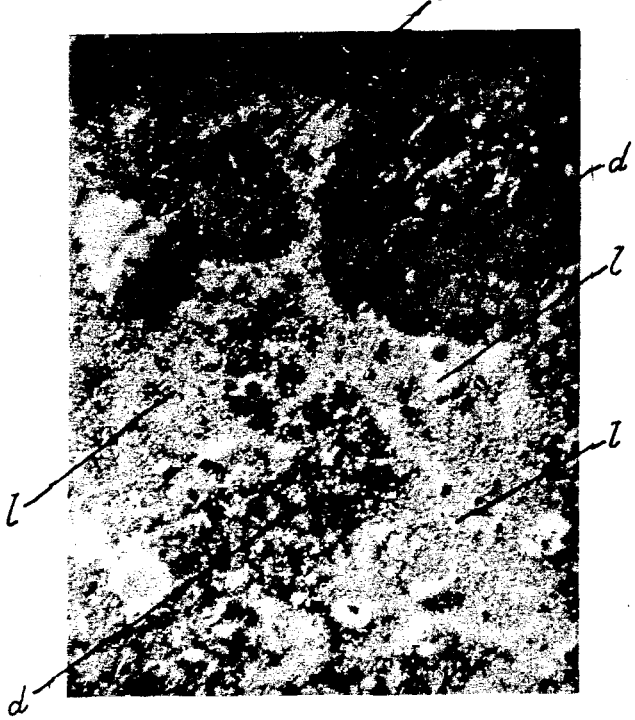

Nov. 6, 1956     F. D. DE VANEY     2,769,719
CEMENT MANUFACTURE

Filed Jan. 13, 1953     2 Sheets—Sheet 1

Inventor:
Fred D. De Vaney,
By Pierce, Scheffler & Parker
his Attorneys

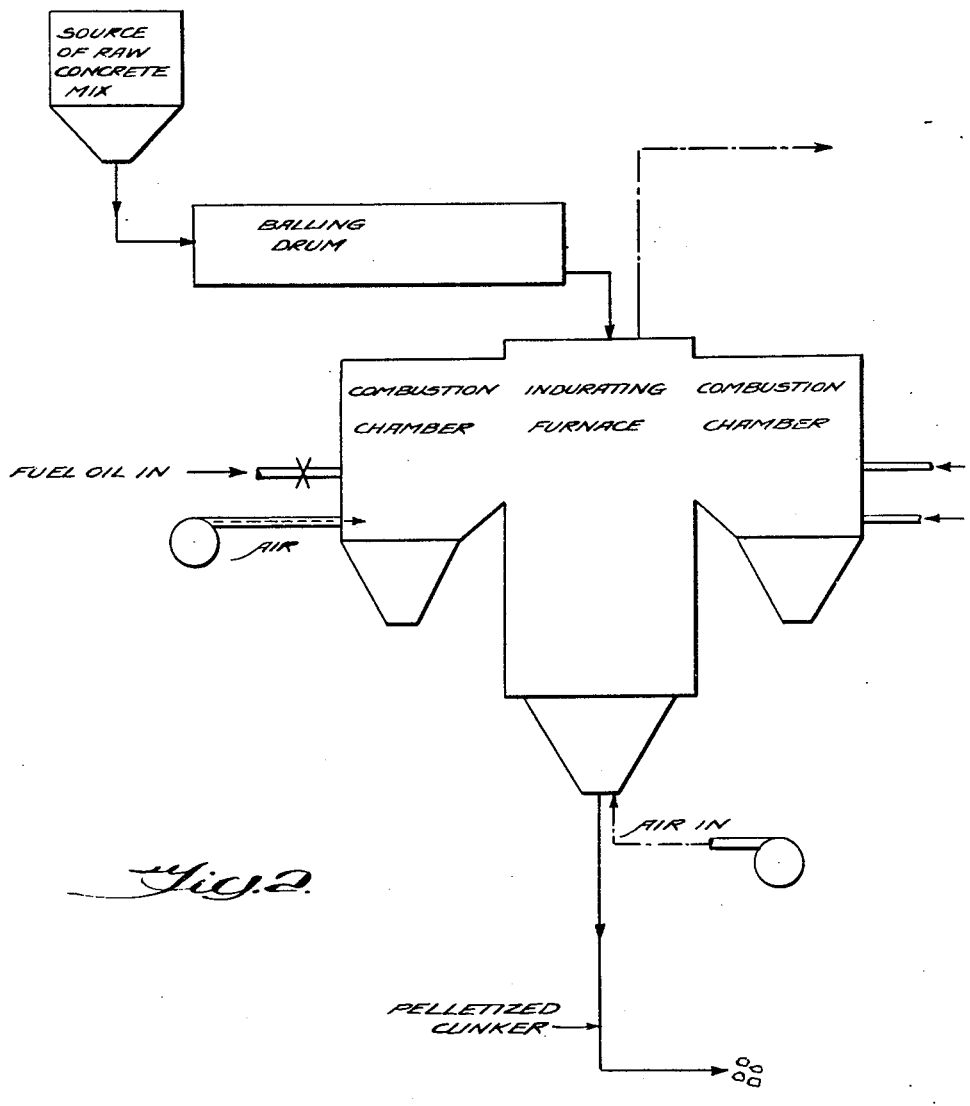

United States Patent Office 2,769,719
Patented Nov. 6, 1956

2,769,719

CEMENT MANUFACTURE

Fred D. De Vaney, Hibbing, Minn., assignor to Erie Mining Company, Hibbing, Minn., a corporation of Minnesota Application January 13, 1953, Serial No. 331,027

1 Claim. (Cl. 106—89)

This invention relates to the art of producing Portland cement, and is concerned with the provision of a novel cement clinker product having improved properties.

In my copending application Serial No. 786,645, filed November 18, 1947 (now Patent No. 2,627,399), the disclosure of which is hereby incorporated into the present application, I have described and claimed a process of, and apparatus for, forming Portland cement clinker from a mix of finely divided cement-making materials, which process involves rolling up a water-wet, homogeneous, plastic mix of the finely divided materials into dense pellets wherein the homogeneously mixed finely divided components are held together under pressure, charging the resulting initially moist raw pellets onto the upper surface of a gradually descending column of similar pellets contained in a vertical furnace chamber, passing a current of heating gas, initially at optimum firing temperature, into said column at a first level intermediate the midpoint and top thereof and counter-currently through the uppermost portion of said column, so maintaining the heat capacity of the heating gas current with respect to the heat capacity of the pellets contacted by said heating gas current that the heating gas departs from the top of said column at a temperature above but close to its dew point, counter-currently forcing initially substantially unheated air through the lowermost portion of said column whereby to cool the pellets in said lowermost portion and simultaneously preheat the air, diverting the preheated air from the column at a second level intermediate the midpoint and bottom thereof to a spacially separate combustion chamber, thermally enriching the preheated air to desired firing temperature by introducing fuel into and burning the same in the preheated air in said combustion chamber, and using the resulting highly heated air-combustion products gas mixture as the heating gas passed through the uppermost portion of said column, the intermediate portion of the column between said first and second levels being a substantial part of the total column and constituting a zone, substantially not traversed by the gas stream, wherein pellets heated to a high temperature short of substantial fusion are maintained for an extended period sufficient to gain substantial completion of inter-particle cement-forming reactions. In the carrying out of this process, the temperature of the gaseous heating medium is maintained at a level above the calcining temperature of the calcium carbonate (approximately 1650° F.) but below the fusion point (or the order of 2350° F.) of the raw mix, e. g., in the range 2000–2200° F. After the carbon dioxide has been driven off the components of the calcined mix—lime, silica and alumina—react to form the various silicates and aluminates, the reaction being exothermic and releasing approximately 180 B. t. u.'s per pound of mix. In the furnacing operation, therefore, as soon as calcination has been effected the interparticle reactions within the pellets tend to raise the temperature in the interior of the pellets appreciably above that of the ambient atmosphere. The temperature within the pellets is, therefore, high enough to promote reactions in the solid state and even sufficient that some fusion of the components within the interiors of the pellets results. Since, however, the temperature of the surrounding gases is well below the fusion point the surfaces of the pellets do not become sticky and hence the pellets do not tend to adhere one to another. The temperatures, in this type of furnacing operation, can be closely controlled and, accordingly, the degree or extent of fusion of components within the interiors of the pellets can be held within close limits. Thus, it is possible to control the amount of interior fusion to a minimum and to depend almost entirely on the reactions of the component minerals in the solid state for producing the necessary cement-forming minerals. The extent to which solid-state reactions are relied upon depends at least in part upon what type of Portland cement is desired.

It has been found desirable in some instances to supply a substantial part of the total heat necessary for effecting the cement-forming reactions by supplementing the heat of reaction and the heat supplied by the gas stream with heat of oxidation of an exothermically oxidizable additive, e. g., a finely subdivided carbonaceous fuel, incorporated into the raw mix prior to the pellet-forming operation. Such carbonaceous fuel advantageously may be powdered anthracite coal or powdered coke, and the amount thereof can be proportioned so that the same can be made to supply a substantial part, even a major part, of the heat necessary for disassociating the calcium carbonate. In some instances it has been found desirable to use from 1% up to as much as 5% by weight of the finely subdivided carbonaceous fuel in the raw mix, which addition tends to promote a more uniform furnacing operation and, also, to insure the existence of a substantially higher temperature level within the interiors of the pellets than obtains at their surfaces which are being bathed with gases at a temperature well below the fusing point of the components of the pellets. This expedient provides further insurance against the fusing together of pellets while at the same time promoting liquid-state reactions, within the interiors of the pellets, in instances where the same are desired.

The furnaced pellet product of the above described process consists of Portland cement "clinker" in the form of discrete, small, spheroids the surfaces of which latter exhibit no substantial amount of fusion but the interiors of which may and generally do exhibit to a greater or lesser extent areas wherein the solids occur in a glassy phase. Whether or not significant amounts of glassy phase are present, the furnaced pellet product is free from any substantial amount of uncombined alkaline earth metal oxides and consists of the combination of alkaline earth metal silicates and aluminates characteristic of well-formed Portland cement clinker.

It is characteristic of the exterior mass of a furnaced pellet which in the raw mix stage had contained a few percent (up to 5%) of powdered carbonaceous fuel that areas of a solid glass phase are present in a "matrix" of fritted glass phase. No carbonaceous fuel as such is present in the furnaced pellet, the same having been completely burned in the course of the furnacing operation using an oxidizing gas as the heating gas.

The invention is illustrated in the accompanying drawing, in which:

Fig. 1 is a reproduction of a photomicrograph made, at a magnification of 15 diameters, of a portion of a polished section of a fired pellet, the darker areas "d" show a practically solid glass phase, while the lighter areas "l" show a fritted glass phase; and Fig. 2 is a diagrammatic representation of the hereinbefore-described process operable for the production of the product claimed herein.

The particles constituting the outer surface layer are essentially unfused except for "edge" and "point" fusions between individual particles: chemically the particles composing the outer layer are essentially the same as the fused material of the interior.

The product of the present invention enjoys properties that make it industrially attractive. Thus, the furnaced product consists of discrete, fluent spheroids substantially free from fines. The spheroids are all of the same order of size: their size can be regulated within the diameter range 2 inches—three-eights inch (the pellet shown in the drawing had a diameter of three-fourths inch). The uniformly-sized, fluent, pellets are easy to handle, transport, and store, and are significantly easier to grind—to a standard fineness—than is the normal Portland cement clinker.

This application contains subject-matter in common with my application Serial No. 786,645, now Patent No. 2,627,399, filed November 18, 1947, and is a continuation-in-part thereof.

I claim:

Portland cement clinker in the form of discrete small spheroids composed of alkaline earth metal silicates and aluminates the outer surface layers of the spheroids being composed of essentially unfused particles of alkaline earth metal silicates and aluminates and the interiors of the spheroids comprising glassy phase fused alkaline earth metal silicates and aluminates of essentially the same chemical composition as are the particles constituting the outer surface layers.

References Cited in the file of this patent

UNITED STATES PATENTS

| | | |
|---|---|---|
| 1,132,527 | Schneider | Mar. 16, 1915 |
| 2,052,329 | Wendeborn | Aug. 25, 1936 |
| 2,090,868 | Hyde | Aug. 24, 1937 |
| 2,214,345 | Pike | Sept. 10, 1940 |
| 2,627,399 | De Vaney | Feb. 3, 1953 |